United States Patent
Zimmel et al.

(10) Patent No.: US 6,866,425 B2
(45) Date of Patent: Mar. 15, 2005

(54) IN-LINE OPTICAL DEVICE WITH REMOVABLE HOUSING AND METHOD

(75) Inventors: Steven C. Zimmel, Minneapolis, MN (US); Ronald J. Drechnik, Roseville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/368,900

(22) Filed: Feb. 14, 2003

(65) Prior Publication Data

US 2004/0161204 A1 Aug. 19, 2004

(51) Int. Cl.⁷ .............................. G02B 6/38; G02B 6/00
(52) U.S. Cl. ............................ 385/73; 385/70; 385/55; 385/140
(58) Field of Search .................... 385/73, 70, 74, 385/55, 140, 60, 75

(56) References Cited

U.S. PATENT DOCUMENTS

| | | | |
|---|---|---|---|
| 4,717,234 A | | 1/1988 | Barlow et al. |
| 5,042,891 A | * | 8/1991 | Mulholland et al. .......... 385/93 |
| 5,267,342 A | | 11/1993 | Takahashi et al. |
| 5,317,663 A | | 5/1994 | Beard et al. |
| 5,642,450 A | | 6/1997 | Oda |
| 5,774,611 A | * | 6/1998 | Nagase et al. ................. 385/58 |
| 5,883,995 A | * | 3/1999 | Lu ............................... 385/60 |
| 6,142,676 A | | 11/2000 | Lu |
| 6,461,055 B1 | * | 10/2002 | Zimmel ........................ 385/73 |
| 2002/0181888 A1 | | 12/2002 | Zimmel |

FOREIGN PATENT DOCUMENTS

| | | |
|---|---|---|
| EP | 0 306 243 A2 | 3/1989 |
| EP | 0 581 527 A1 | 2/1994 |
| EP | 1 041 413 A1 | 10/2000 |
| EP | 1 041 415 A1 | 10/2000 |
| JP | 62-121405 | 6/1987 |
| JP | 01-279206 | 11/1989 |
| JP | 08-122531 | 5/1996 |
| JP | 10-246813 | 9/1998 |

OTHER PUBLICATIONS

"Build–Out Attenuators—WDM Bandwidth/Low Return Loss UPC–APC Styles," *Nanometer Technologies Inc.*, http://www.nanometer.com/Products/Attenuators/Atten_Build_Out/atten_build_out.htm, 1 pg. (©2001).

"FOA–INASC05 Attenuator," *ADC*, 1 pg. (©2001).

* cited by examiner

*Primary Examiner*—Chandrika Prasad
(74) *Attorney, Agent, or Firm*—Merchant & Gould PC (57) ABSTRACT

The present invention relates to an in-line fiber optic device including a housing and an opening extending through the housing defining an optical pathway, the pathway including an optically significant element for altering a signal transmitted through the pathway, and the device including a housing with a removable portion to permit access to the optical path. The present invention also relates to a fiber optic device with a housing defining an optical path with a first and second ferrule, the optical path including an optically significant element and a first end of the housing about an outer end of the first ferrule removable to permit access to the first end of the first ferrule. The present invention further relates to a system for altering the signal being transmitted through an optical fiber telecommunications connection. The present invention also relates to a method of providing an optically significant element in an optical fiber telecommunications assembly.

42 Claims, 10 Drawing Sheets

IN-LINE OPTICAL DEVICE WITH REMOVABLE HOUSING AND METHOD

FIELD OF THE INVENTION

The present invention relates to in-line optical devices for optical fiber telecommunications applications. More specifically, the present invention relates to an in-line optical device with a removable rear housing.

BACKGROUND OF THE INVENTION

In the fiber optical telecommunication systems, it is sometimes advantageous to moderate or attenuate the signal transmitted over the optical fiber. Some form of attenuation medium, such as a mirror or a filter, may be placed in the path of the signal to provide this desired attenuation effect. This attenuation medium may be housed within a structure which is inserted between and mates with a connector at an end of a fiber optic cable and an adapter which mates with and aligns connectors from two optical fiber cables.

In-line optical devices providing different levels of attenuation may be available for insertion within the optical transmission to permit the level of attenuation to match the requirements of the particular devices connected by the cables.

When installing a fiber optic in-line device, it is desirable to ensure that no contaminants such as moisture or dust are present on the polished ferrule end faces within the device. Such contaminants may alter the power of the signal transmitted through the device and change the level of attenuation or other signal alteration provided by the device. In many of the known formats (for example, SC and FC) of mating adapter and connector designs for optical fiber cables, one of the ferrule end faces may be difficult to access directly to clean. Improvements to the structure of in-line devices are desirable to improve access to the ferrule end faces within the device for inspection and cleaning.

SUMMARY OF THE INVENTION

The present invention relates to a fiber optic device defining a housing with an optical pathway. The housing includes a removable portion about a first end of the optical pathway to permit access to the first end of the pathway. The pathway includes an optically significant element for altering an optical signal transmitted through the device. The optically significant element may be a filter, an air gap or some form of attenuator. The pathway may include a ferrule with an end face adjacent the removable portion of the housing and removal of the housing allowing access to the end face to clean the end face.

The present invention further relates to system for providing attenuation in an optical fiber telecommunications connection.

The present invention further relates to a method for providing an attenuation device in an optical fiber telecommunications connection.

BRIEF DESCRIPTION OF THE DRAWINGS

The invention may be more completely understood by considering the detailed description of various embodiments of the invention that follows in connection with the accompanying drawings.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
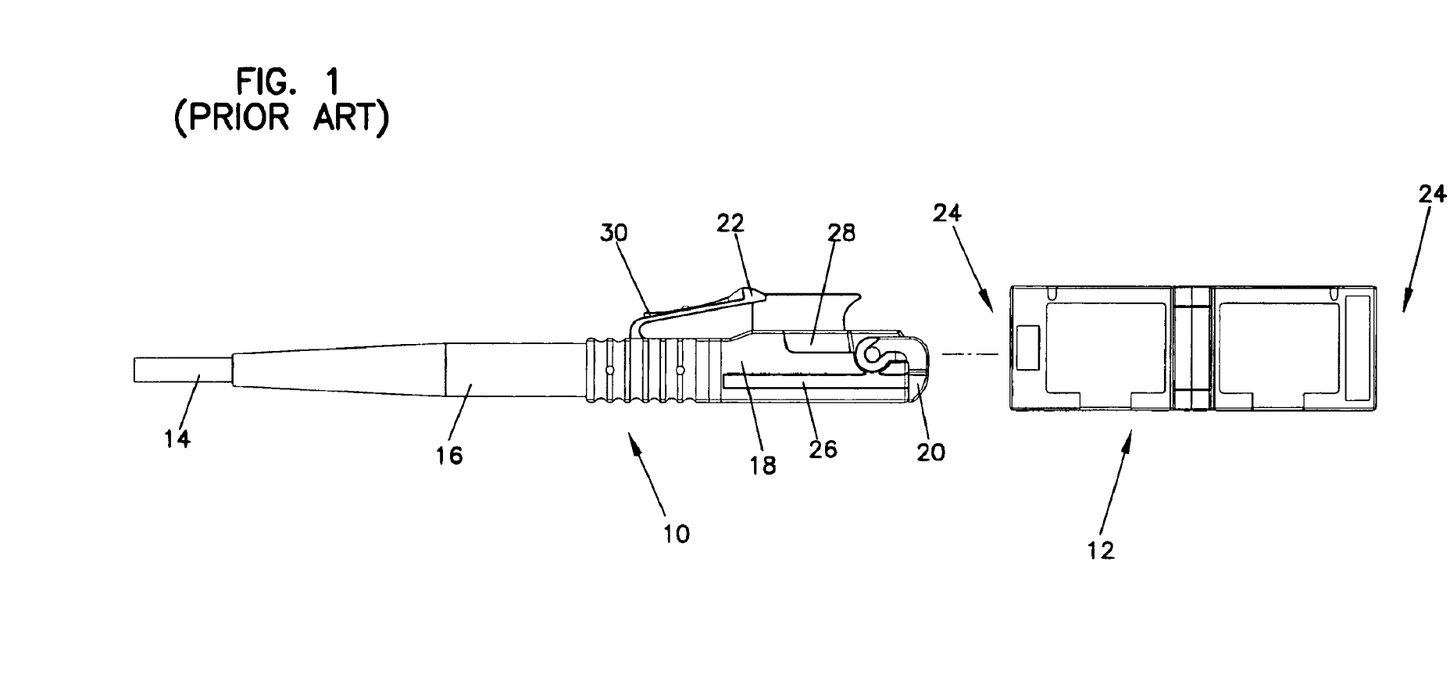
FIG. 1 is a side view of a prior art fiber optic connector positioned for insertion into a fiber optic adapter.

As shown in FIG. 1, a known fiber optic connector 10 and a known adapter 12 mate with each other and provide a location for optically connecting devices within a telecommunications installation. Adapter 12 has a pair of openings 24 at opposite ends which are configured to mate with a connector body 18 of connector 10. Connector 10 is mounted to an optical fiber cable 14 and includes a strain relief boot 16, connector body 18, and a front cover 20 covering the end of connector 10. When a connector 10 is inserted into each opening 24, the optical fiber within the connectors 10 are aligned so that signals can be transmitted from one telecommunications device to another. Further details of the connectors and adapters shown in FIG. 1 can be found in U.S. Pat. No. 5,883,995, issued Mar. 16, 1999, and U.S. Pat. No. 6,142,676, issued on Nov. 7, 2000, the disclosures of which are incorporated herein by reference.

Figure 2:
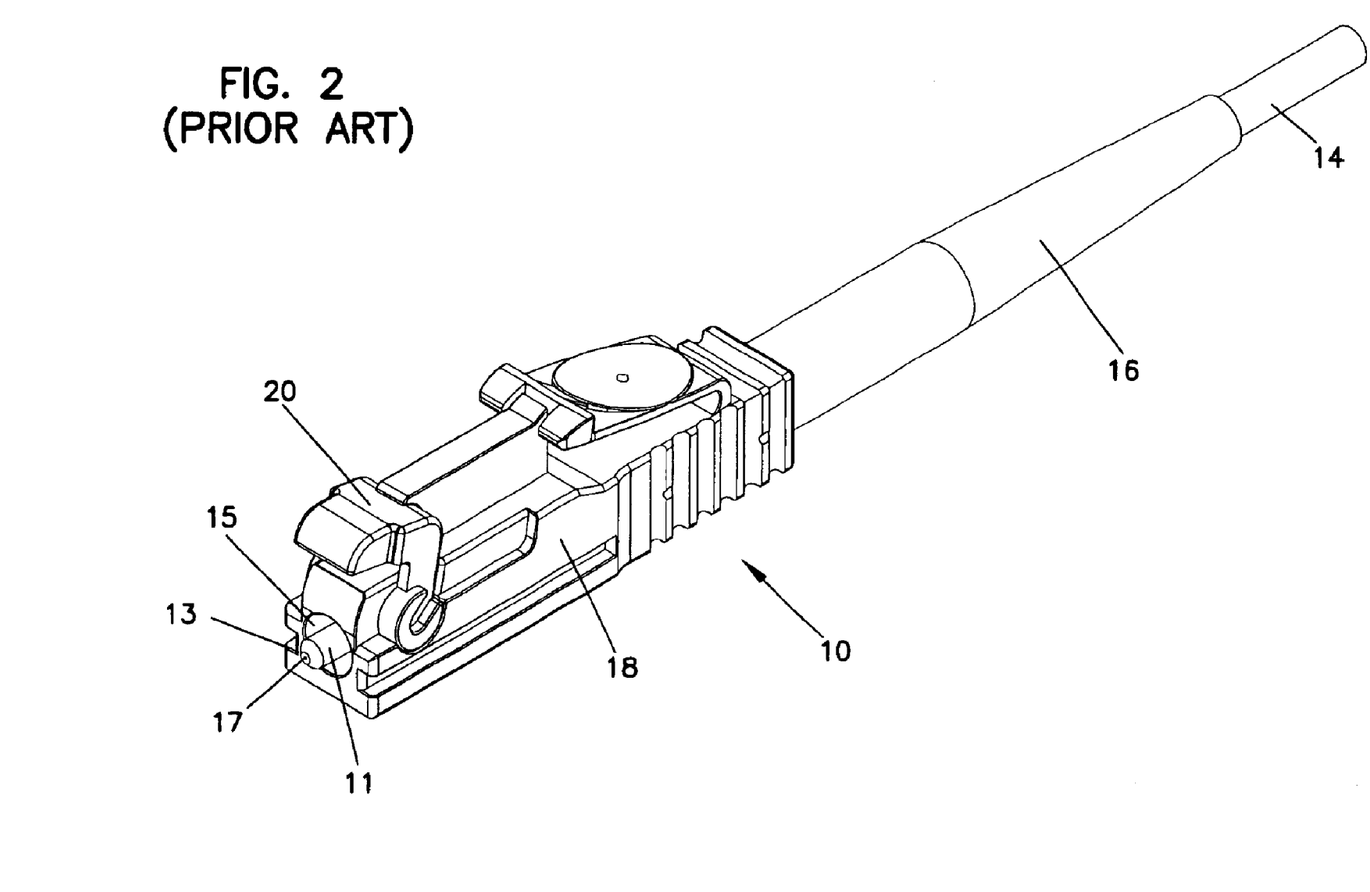
FIG. 2 is a front perspective view of the fiber optic connector of FIG. 1 with the front cover moved to expose an end face of a ferrule.

FIG. 2 shows connector 10 with front cover 20 raised to expose a ferrule 11 with an end face 13 positioned within an opening 15 for receiving and mating with an alignment sleeve. In the middle of end face 13 is an end of an optical fiber 17.

As disclosed in the above-referenced patents, front cover 20 provides protection to a polished end face of the optical fiber within connector 10 and prevents accidental exposure to light pulses transmitted over cable 14. An alignment channel 26 receives an alignment rail within opening 24 to properly position connector 10 within adapter 12. A pin channel 28 receives a pin within opening 24, after the pin has engaged and opened front cover 20. A catch 22 mounted to connector 10 by a deformable arm 30 provides a releasably mechanism for holding connector 10 and adapter 12 together when connector 10 is fully inserted within opening 24.

It is often necessary or desirable to insert an in-line device in an optical fiber path to alter the signal being transmitted over the path. The in-line device may include an optically significant element, such as a filter, to block certain wavelengths of the signal, or an attenuator, to reduce the intensity of the signal. In the present application, the in-line optical device shown is preferably described as an in-line attenuator including an attenuation medium as the optically significant element. However, the in-line device could include a filter in place of the attenuation medium as the optically significant element.

Regardless of the function of the device, the in-line device of the present invention includes an optical path with at least one ferrule end enclosed in a sleeve within a housing. Such a ferrule end is difficult to reach to clean contaminants from the optical path. A portion of the housing about the ferrule end and a portion of the sleeve are removable to allow access to the ferrule end for cleaning.

Figure 3:
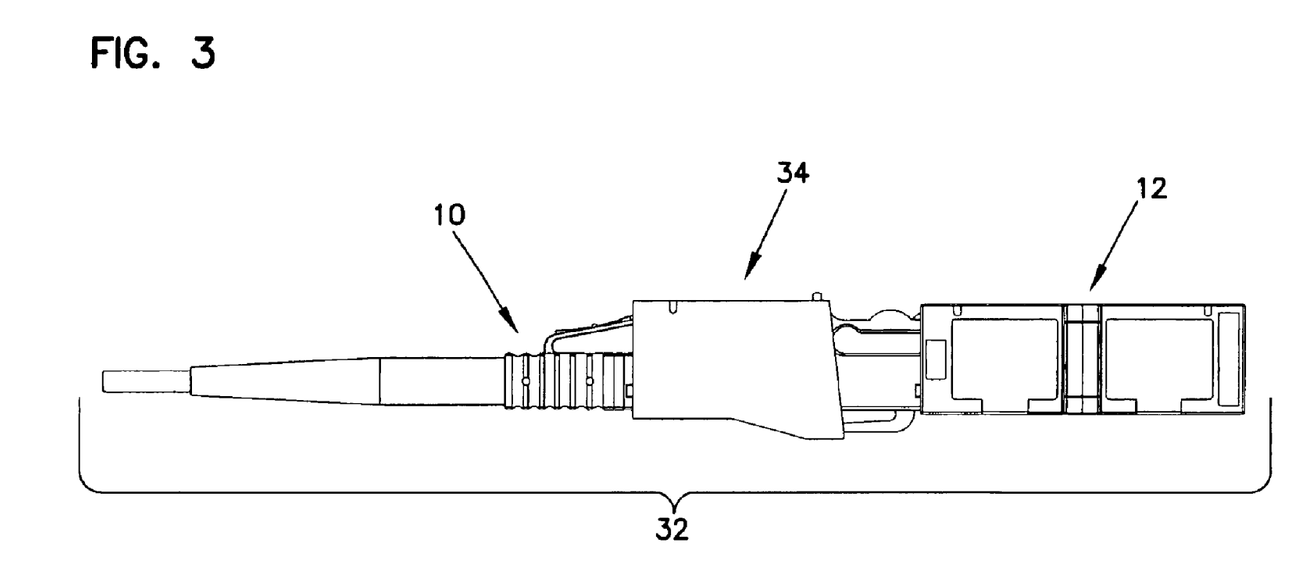
FIG. 3 is a side view of an assembly of the fiber optic connector and adapter of FIG. 1, with an in-line fiber optic device according to the present invention positioned between the connector and adapter.
Figure 4:
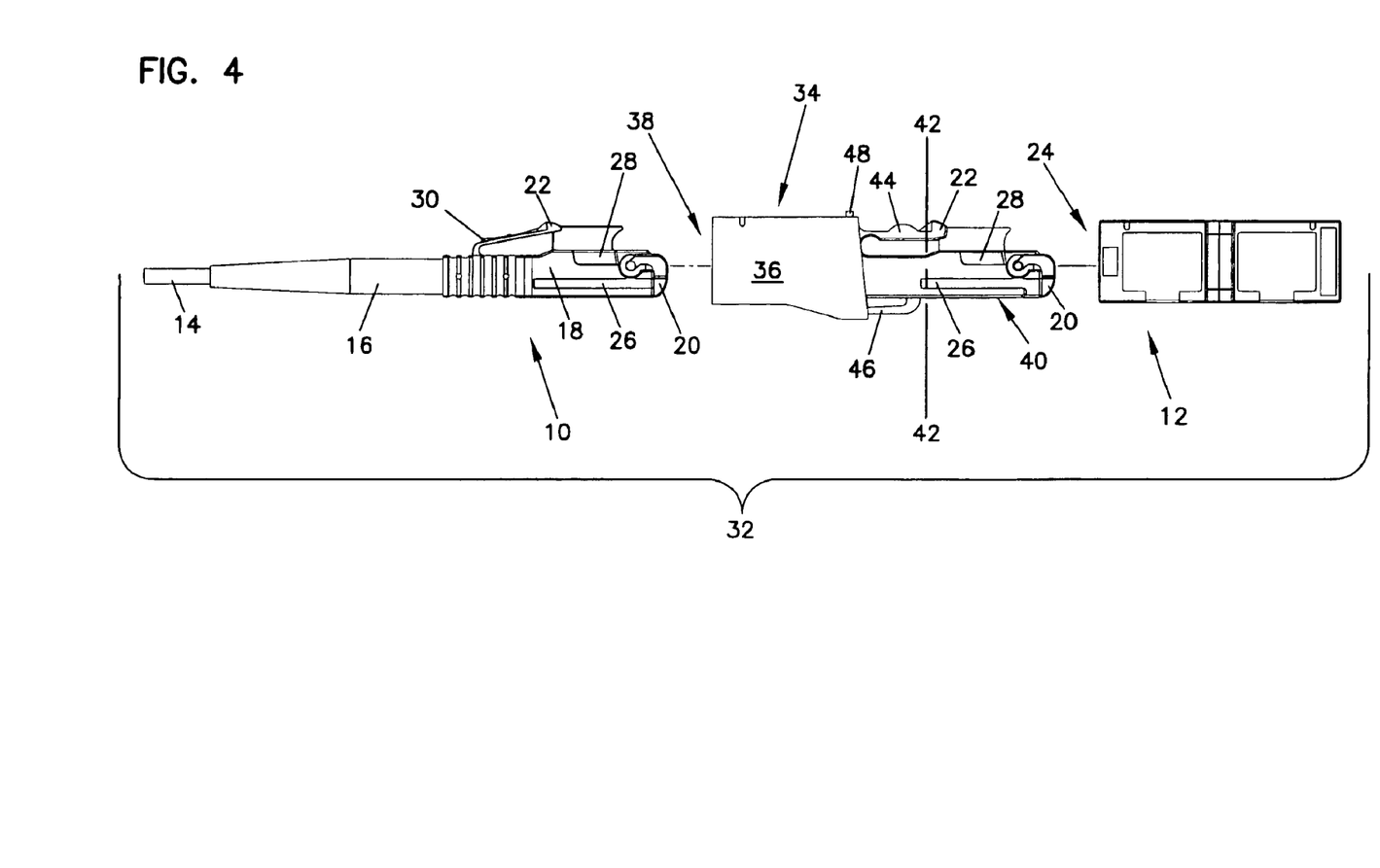
FIG. 4 is an exploded side view of the assembly of the connector, in-line fiber optic device and adapter of FIG. 3.

Referring now to FIGS. 3 and 4, an assembly 32 including connector 10, adapter 12 and an in-line fiber optic device 34 is shown. In-line fiber optic device 34 includes a front housing 40 which is shaped in the same fashion as connector body 18 of connector 10. Front housing 40, up to line 42—42 in FIG. 4, includes front cover 20, catch 22, alignment channel 26 and pin channel 28, in generally the same configuration as housing 18. Front housing 40 is thus configured to be inserted into opening 24 of adapter 12. When in-line fiber optic device 34 is inserted into adapter 12, catch 22, mounted to a deformable arm 44, operates to releasably hold in-line fiber optic device 34 to adapter 12. In-line fiber optic device 34 further includes a rear housing 36 defining an opening 38 for receipt of connector 10. Rear housing 36 is releasably mounted to in-line fiber optic device 34 by a spring tab 46 and a removable member 48, which will be discussed in further detail below.

Figure 5:
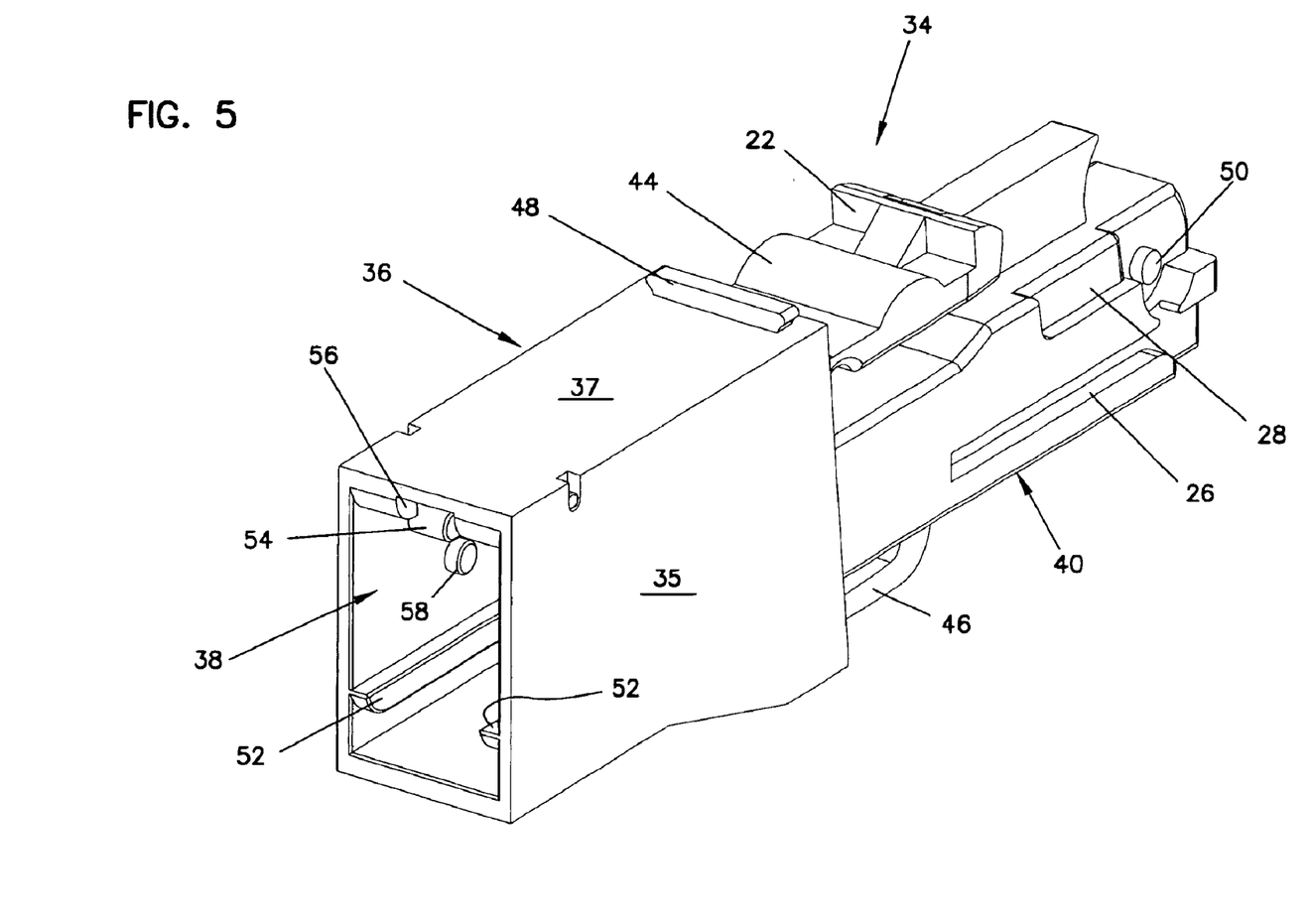
FIG. 5 is a side perspective view of the in-line fiber optic device of FIG. 4, with the front cover and inner door removed.

Referring now to FIG. 5, opening 38 in rear housing 36 of in-line fiber optic device 34 is shown. Within opening 38 is a pair of alignment rails 52 on an inner surface of opposing side walls 35, which cooperate with alignment channels 26 on either side of connector 10 to properly position connector body 18 within in-line fiber optic device 34. Also within opening 38 is a pair of doorstop pins 54 on the inner surface of opposing walls 35 which serve to limit the travel of inner door 60, shown in FIGS. 7 and 8. Also within opening 38 is a pair of shutter pins 58 on the inner surface of opposing side walls 35 which engage and open front cover 20 as connector 10 is inserted within opening 38, allow signals to be transmitted from cable 14 through connector 10 and through in-line fiber optic device 34. Along an inner surface of an upper wall 37 are ledges 56, which releasably engage catch 22 of connector 10 to releasably hold connector body 18 within opening 38.

At the end of front housing 40 opposite from rear housing 36 is a pivot 50 about which front cover 20 is mounted and rotates to permit or block transmission of signals through in-line fiber optic device 34.

Figure 6:
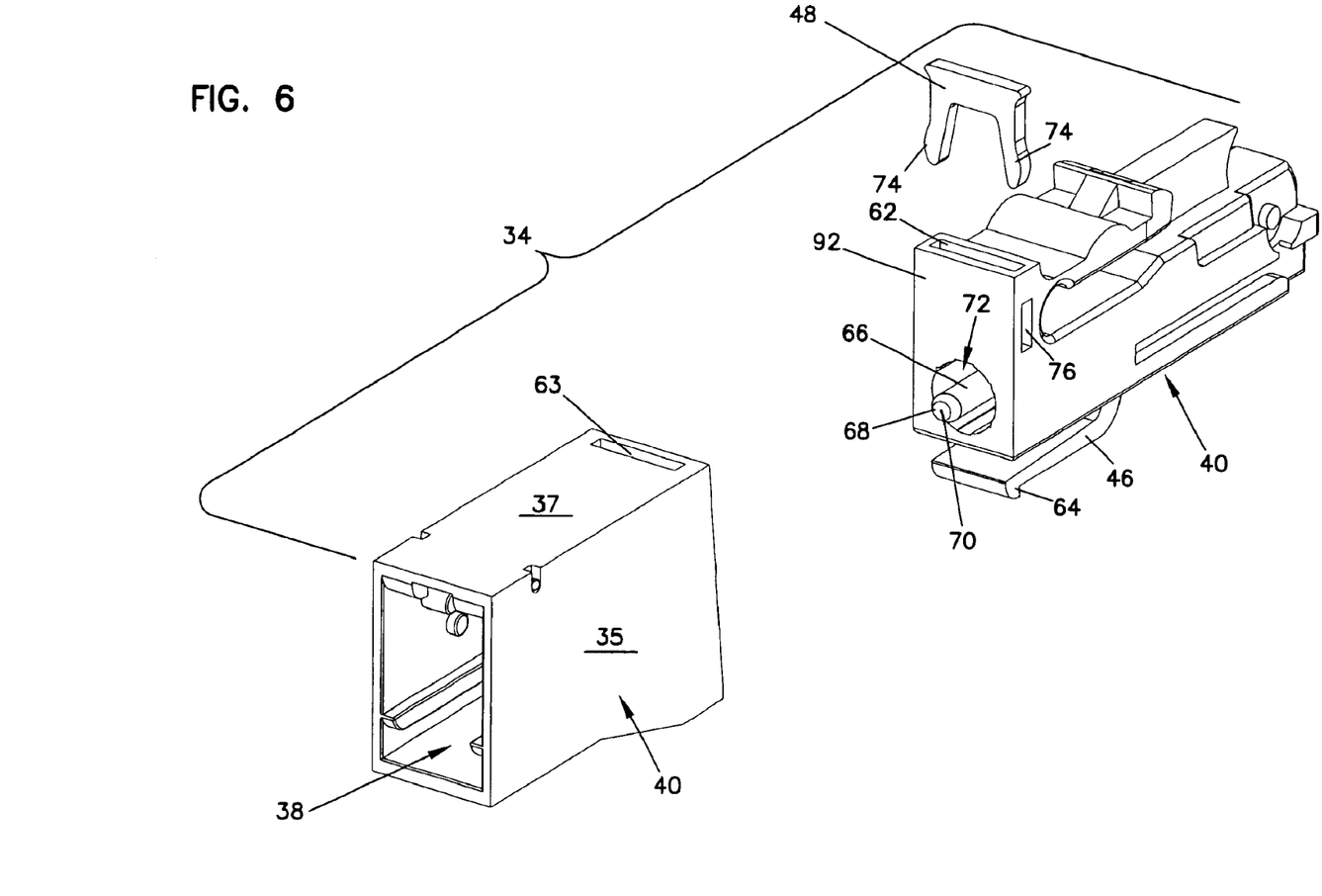
FIG. 6 is an exploded side perspective view of the in-line fiber optic device of FIG. 5.

Referring now to FIG. 6, a ferrule 66 is located within front housing 40 and includes a polished end face 68, in the center of which is a segment of optical fiber 70. Removable member 48 is inserted through a mounting slot 63 in upper wall 37 of rear housing 36 and engages a mounting slot 62 in front housing 40 to hold in-line fiber optic device 34 together. A pair of tabs 74 on removable member 48 engages a pair of slots 76 in front housing 40 so that removable member 48 is more securely held within slot 62. Ferrule 66 is positioned within an opening 72 in an inner wall 92 of front housing 40 for receiving a sleeve 80 (see FIGS. 7–9, discussed below).

Figure 7:
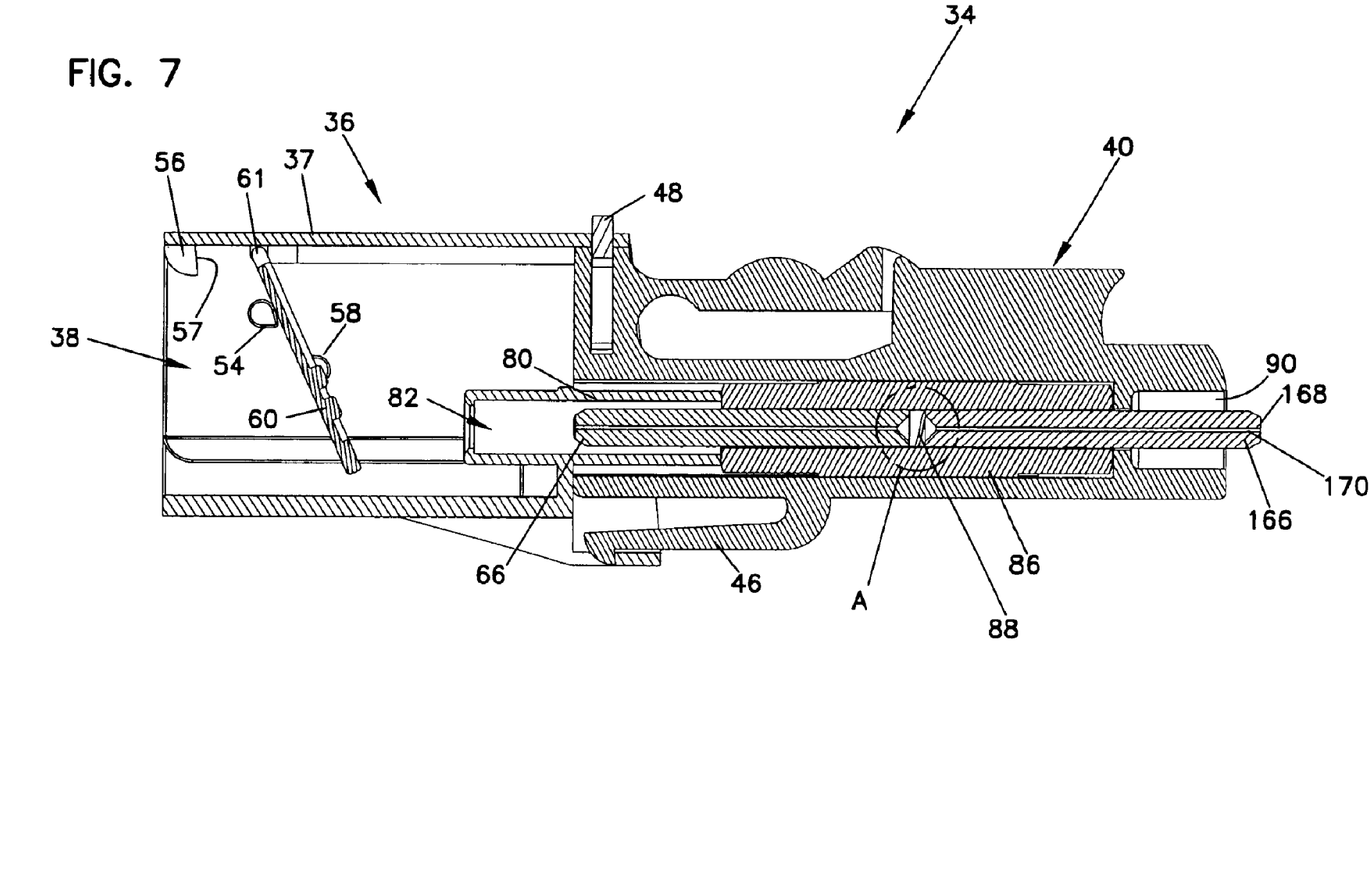
FIG. 7 is a side cross-sectional view of the in-line fiber optic device of FIG. 4 taken along the centerline of the ferrule within the device with the inner door positioned within the rear housing.
Figure 8:
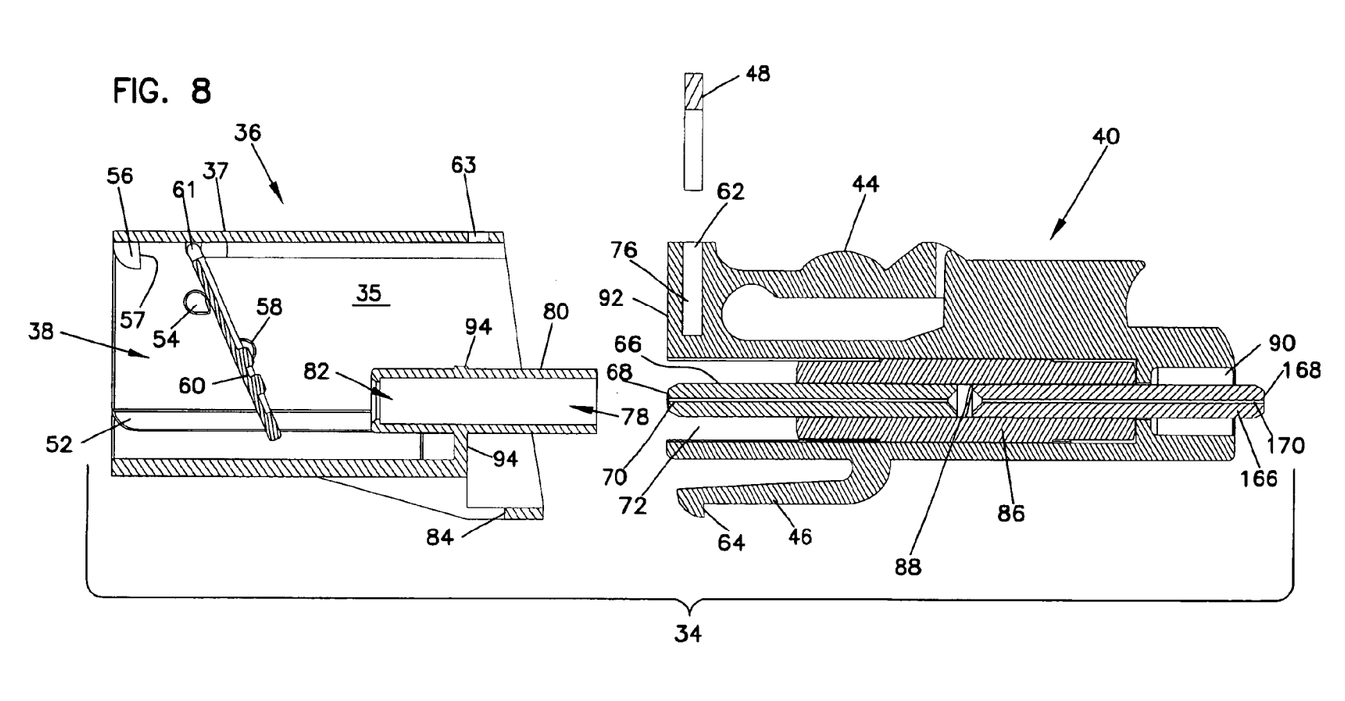
FIG. 8 is an exploded side cross-sectional view of the in-line fiber optic device of FIG. 7.
Figure 9:
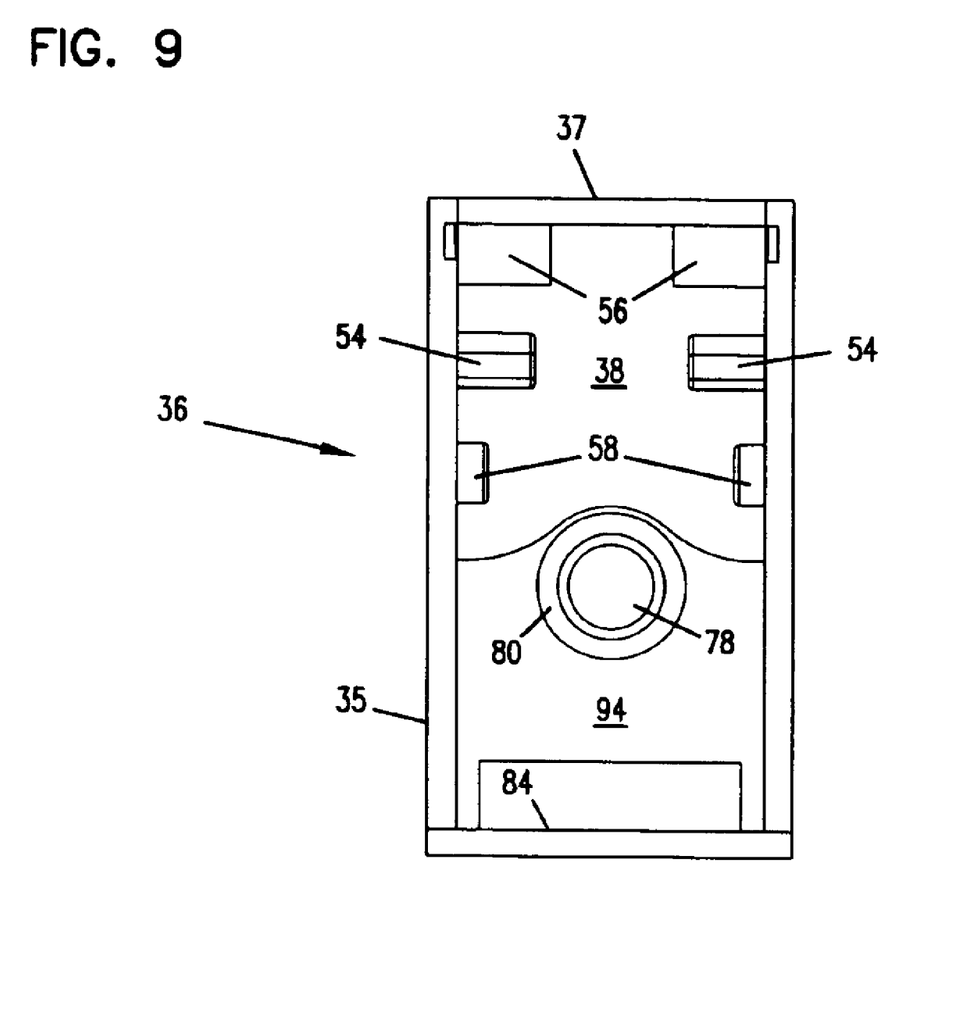
FIG. 9 is an end view of the front end of the rear housing of the in-line fiber optic device of FIG. 3.

Referring now to FIGS. 7, 8 and 9, additional detail of in-line fiber optic device 34 is shown. Door 60 extends down from a pivot 61 adjacent the inner surface of upper wall 37 and is biased to against doorstop pins 54. Ledges 56 have an inner surface 57 which engages catch 22 of connector 10. Insertion of connector 10 within opening 38 forces door 60 up against the inner surface of upper wall 37 of rear housing 36. Shutter pins 58 engage front cover 20 and force shutter 20 up, exposing ferrule 11 situated within an opening 15 and having an end face 13 and including a optical fiber 17 (see FIG. 2). End face 13 enters an opening 82 of sleeve 80 (opening 82 and opening 78 are at opposite ends of sleeve 80) and engages end face 68 of ferrule 66 with optical fiber 17 optically aligned with optical fiber 70.

Upper wall 37 of rear housing 36 extends over front housing 40 so that mounting slot 63 overlays mounting slot 62, allowing removable member 48 to be inserted. Spring tab 46 includes a locking ledge 64, which engages spring catch 84 of rear housing 36. Spring tab 46 and removable member 48 cooperate to removably hold rear housing 36 and front housing 40 together. A front inner face 94 of rear housing 36 engages inner wall 92 of front housing 40 to limit the depth of insertion of front housing 40 into rear housing 36.

Within front housing 40 is channel 72 containing a hub 86. Inserted into opposite ends of hub 86 are ferrule 66 and a ferrule 166. Ferrule 166 includes a polished end face 168 and an optical fiber segment 170. Optical fibers 70 and 170 are axially aligned to permit the transmission of signals through hub 86. Positioned within hub 86 between ferrules 66 and 166 is an optically significant element 88. Optically significant element 88 may be a mirror, a filter, or similar object which serves to attenuate, filter or otherwise modify the signal being transmitted. Ferrule 166 extends through a front end of front housing 40 within an opening 90, which will receive the sleeve of adapter 12 when in-line fiber optic device 34 is inserted into adapter 12.

Figure 10:
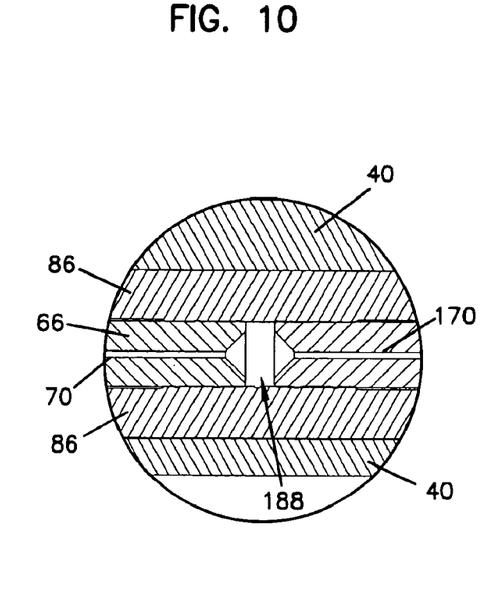
FIG. 10 is a close view of the area within circle of FIG. 9, with a first alternative optically significant element.
Figure 11:
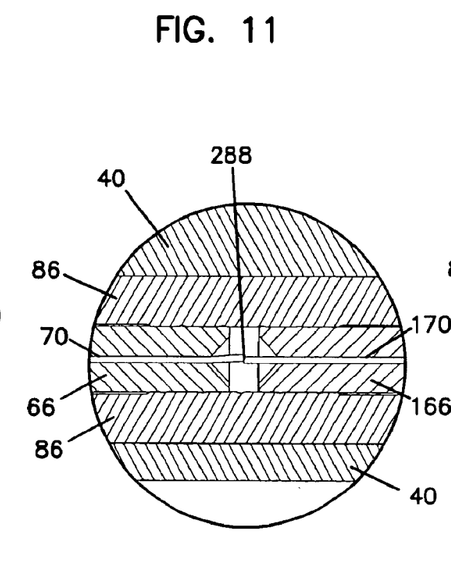
FIG. 11 is a close view of the area within circle of FIG. 9, with a second alternative optically significant element.
Figure 12:
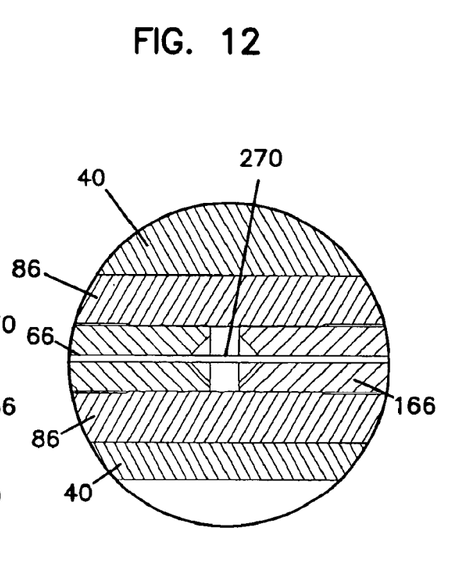
FIG. 12 is a close view of the area within circle of FIG. 9, with a third alternative optically significant element.

Alternatively, optically significant element 88 may be an airgap 188 located between optical fiber segments 70 and 170 within hub 86 (see FIG. 10). Alternatively, the optically significant element between optical fiber segments 70 and 170 may be an offset splice 288 within hub 86 (see FIG. 11). Alternatively, a length of high attenuation fiber 270 extending through hub 86 from polished end 68 to polished end 168 may be included in place of optical fiber segments 70 and 170 (see FIG. 12). Such a high attenuation fiber segment 270 would be part of the optical path between polished end faces 68 and 168 as well as the optically significant element within hub 86.

As shown in the FIGS. above, rear housing 36 is held to front housing 40 by removable member 48 and spring tab 46. Rear housing 36 may also be held to front housing 40 by a friction fit between the outer surface of front housing 40 and the inner surface of rear housing 36 when in-line fiber optic device 34 is to be used in an environment where little or no stress is placed on cable 14 which might act to pull the front and rear housings apart, or where an external support structure might serve to prevent stress on cable 14 from being transmitted to in-line fiber optic device 34. Either removable member 48 or spring tab 46, or both, may be added to in-line fiber optic device 34 to prevent the housings from being accidentally separated, while still allowing rear housing 36 to be removed to permit access to end face 68.

To provide an optically significant element in an existing optical fiber transmission circuit, connector 10 would be removed from adaptor 12. Rear housing 36 is removed from front housing 40 of in-line fiber optic device 34 and end face 68 is cleaned to remove any contaminants such oil, dust or similar material is removed from the end of optical fiber 70. Methods of cleaning may include blowing with compressed air, wiping with an alcohol pad or other solvent-laden cleaning products, or other contaminant removal procedures. To provide accurate attenuation within in the optical fiber transmission circuit, it is desirable that the optical connection between different fiber segments be as free of contaminants as possible. Rear housing 36 is replaced onto front housing 40 and secured in place by spring clip 46 and removable member 48.

Once end face 68 has been cleaned, connector 10 is then inserted within opening 38 so that ferrule 11 within connector 10 is positioned within opening 82 and optical fiber 17 within cable 14 is optically aligned with optical fiber 70. When connector 10 is fully inserted, catch 22 of connector 10 engages inner surfaces 57 of ledges 56 to releasably hold connector 10 and in-line fiber optic device 34 to one another. Front end 40 is inserted into opening 24 of adapter 12 so that ferrule 166 is engaged within a sleeve inside adapter 12.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic device comprising:
   a front housing including a first end configured to receive an optical fiber connector and a rear housing with a second end configured for insertion into an optical fiber adapter;
   an opening extending through the housing between the first end and second end defining an optical path including an optically significant element for modifying a signal being transmitted through the optical path;
   wherein the front housing is removable from and releasably held to the rear housing and removal of the front housing from the rear housing permits access to the optical path.

2. The fiber optic device of claim 1, wherein the optically significant element includes an offset splice between optical fiber segments within the optical path.

3. The fiber optic device of claim 1, wherein the optically significant element includes an airgap.

4. The fiber optic device of claim 1, wherein the optically significant element includes a mirror.

5. The fiber optic device of claim 1, wherein the optically significant element includes a filter.

6. The fiber optic device of claim 1, wherein the optical path includes a ferrule having an end face proximate the first end, the end face of the ferrule positioned within a sleeve, the front housing including a portion of the sleeve, and removal of the front housing permitting access to the end face of the ferrule.

7. The fiber optic device of claim 1, wherein the front housing is releasably held to the rear housing by a removable member.

8. The fiber optic device of claim 1, wherein the front housing is releasably held to the rear housing by a spring catch.

9. The fiber optic device of claim 8, wherein the front housing is releasably held to the rear housing by a removable member.

10. A device for insertion within an optical fiber transmission path, the device comprising:
    a first optical fiber ferrule and a second optical fiber ferrule;
    a body including a front housing with a first end positioned about the first ferrule and a rear housing with a second end positioned about the second ferrule and providing an optical path between the first end and the second end through the first and second ferrules, the optical path including an optically significant element;
    a sleeve mounted about an outer end of the first ferrule, and the first end of the body positioned about the sleeve adapted to receive and mate with a connector of an optical fiber cable so that an optical path within the cable is aligned with the optical path of the body;
    the second end of the body opposite the first end adapted to be received within and mate with an adapter so that an optical path through the adapter is aligned with the optical path of the body;
    the front housing of the body releasably held to the rear housing and removable from the rear housing to allow access to the outer end of the first ferrule.

11. The device of claim 10, wherein the optical path of the body includes at least one segment of optical fiber mounted within the ferrules.

12. The device of claim 11, wherein the optical path of the body includes two segments of optical fiber, one of the segments mounted within each of the ferrules with the optically significant element positioned between the two segments.

13. The device of claim 12, wherein the optically significant element includes an air gap.

14. The device of claim 12, wherein the optically significant element includes a mirror.

15. The device of claim 12, wherein the optically significant element includes an offset splice connecting an inner end of one of the optical fiber segments to an inner end of the other optical fiber segment.

16. The device of claim 11, wherein single segment of optical fiber extends through the first ferrule and the second ferrule and the single segment provides the optically significant element.

17. A fiber optic device comprising:
    a housing including a front housing and a rear housing with an optical path extending therethrough;
    a first ferrule and a second ferrule within the optical pathway, each ferrule having an outer end with a polished face and a segment of optical fiber within a central opening in the ferrule;
    the ferrules arranged within the optical path to so that the optical fiber segments within the ferrules are axially aligned and an optically significant element is positioned between an inner end of the ferrules;
    the outer end of the first ferrule extending from a first end of the rear housing, the first end configured to be received within a fiber optic adapter;
    the outer end of the second ferrule enclosed by a second end of the front housing, the second end configured to receive a fiber optic connector, the front housing removably attached to the rear housing, wherein removing the front housing from the rear housing allows access to the outer end of the second ferrule.

18. The fiber optic device of claim 17, wherein the first end is configured to be received within a fiber optic adapter.

19. The fiber optic device of claim 18, wherein the inner ends of the ferrules are positioned within a sleeve.

20. The fiber optic device of claim 19, wherein the optically significant element is positioned within the sleeve between the inner ends of the ferrules.

21. The fiber optic device of claim 20, wherein removal of the front housing from the rear housing removes a portion of the sleeve about the outer end of the second ferrule without releasing the second ferrule from the housing.

22. The fiber optic device of claim 20, wherein the optically significant element includes a filter.

23. The fiber optic device of claim 20, wherein the optically significant element includes a mirror.

24. The fiber optic device of claim 20, wherein the optically significant element includes an air gap.

25. The fiber optic device of claim 20, wherein the optically significant element includes an offset splice connecting an inner end of the optical fiber of the first ferrule with an inner end of the optical fiber of the second ferrule.

26. The fiber optic device of claim 17, wherein the front housing is releasably held to the rear housing by a snap-fit connection.

27. The fiber optic device of claim 17, wherein the front housing is releasably held to the rear housing by a friction fit connection.

28. The fiber optic device of claim 17, wherein the front housing is releasably held to the rear housing by a removable member.

29. A system for altering a signal transmitted through an optical fiber telecommunications connection comprising:
   a fiber optic connector mounted to an optical fiber cable such that an end of the optical fiber within the cable extends through the connector into a ferrule which is located adjacent a mating end of the connector;
   a fiber optic adapter configured to receive and mate with the mating end of the fiber optic connector of the fiber optic cable so that the ferrule of the connector is positioned within a sleeve in the adapter;
   an in-line device including:
      a housing with a front housing and a rear housing:
      a first end of the rear housing configured to be received within the adapter and including a ferrule that is received within the sleeve of the adapter;
      a second end of the front housing configured to receive the mating end of the fiber optic connector of the fiber optic cable;
      an optical path extending through the housing including a sleeve for receiving the ferrule of the fiber optic connector of the fiber optic cable and aligning the ferrule of the adapter with the ferrule of the fiber optic connector of the fiber optic cable;
      the optical path through the housing including optically significant element;
      the front housing removably mounted to the rear housing.

30. A method for altering a signal transmitted through an optical fiber telecommunications assembly comprising the steps of:
   providing an in-line device including a housing with a front housing removably mounted to a rear housing defining an optical pathway between a first end of the front housing and a second end of the rear housing, the first end configured to be received within a fiber optic adapter, the second end configured to receive a fiber optic connector, and a ferrule within the optical pathway having an end face located within the in-line device adjacent the first end, the optical pathway including an optically significant element;
   removing the front housing from the rear housing;
   cleaning the end face of the ferrule;
   remounting the front housing to the rear housing.

31. The method of claim 30, further comprising the steps of:
   inserting an optical fiber connector into the first end of the in-line device so that an optical fiber within the connector is aligned with the optical pathway at the end face; and
   inserting the second end of the in-line device within an optical fiber adaptor so that the optical pathway is aligned with an alignment sleeve within the adaptor.

32. The method of claim 30, wherein the first end of the front housing defines an adapter end for receiving a fiber optic connector.

33. A fiber optic device comprising:
   (a) a housing construction including:
      (1) a first housing portion defining a connector end;
      (2) a second housing portion defining an adapter end;
   (b) a ferrule construction mounted within the housing construction, the ferrule construction including:
      (1) a first ferrule end positioned at the connector end of the first housing portion;
      (2) a second ferrule end positioned at the adapter end of the second housing portion;
      (3) the ferrule construction including an optical path including an optically significant element for modifying a signal being transmitted through the optical path; and
   (c) the second housing portion including a sleeve positioned around the second ferrule end, wherein the second ferrule end is disposed within the sleeve and spaced from an end of the sleeve.

34. The fiber optic device of claim 33, wherein the optically significant element includes an offset splice between optical fiber segments within the optical path.

35. The fiber optic device of claim 33, wherein the optically significant element includes an airgap.

36. The fiber optic device of claim 33, wherein the optically significant element includes a mirror.

37. The fiber optic device of claim 33, wherein the optically significant element includes a filter.

38. The fiber optic device of claim 33, wherein the connector end of the first housing portion is configured for insertion into an optical fiber adapter.

39. The fiber optic device of claim 33, wherein the first ferrule end is positioned within a sleeve of the first housing portion and removal of the first housing portion permits access to the first ferrule end.

40. The fiber optic device of claim 33, wherein the first housing portion is releasably held to the second housing portion by a removable member.

41. The fiber optic device of claim 33, wherein the first housing portion is releasably held to the second housing portion by a spring catch.

42. The fiber optic device of claim 41, wherein the first housing portion is releasably held to the second housing portion by a removable member.

* * * * *

UNITED STATES PATENT AND TRADEMARK OFFICE
CERTIFICATE OF CORRECTION

PATENT NO. : 6,866,425 B1  
DATED : March 15, 2005  
INVENTOR(S) : Zimmel et al.

It is certified that error appears in the above-identified patent and that said Letters Patent is hereby corrected as shown below:

Title page,
Item [57], ABSTRACT,
Line 6, after the word "a" add -- front housing --.
Line 6, after the word "removable" delete "portion" and add -- frame rear housing --.
Line 10, after the word "a" delete "first end of the" and add -- front --.
Line 11, after the word "removable" add -- from a rear housing --.

Column 6,
Line 59, delete the word "to".

Signed and Sealed this

Nineteenth Day of July, 2005

JON W. DUDAS
*Director of the United States Patent and Trademark Office*